(12) United States Patent
Chari et al.

(10) Patent No.: US 9,558,347 B2
(45) Date of Patent: Jan. 31, 2017

(54) DETECTING ANOMALOUS USER BEHAVIOR USING GENERATIVE MODELS OF USER ACTIONS

(71) Applicant: GLOBALFOUNDRIES INC., Grand Cayman (KY)

(72) Inventors: Suresh N. Chari, Tarrytown, NY (US); Ian M. Molloy, Chappaqua, NY (US); Youngja Park, Princeton, NJ (US); Wilfried Teiken, Ossining, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 392 days.

(21) Appl. No.: 14/011,213

(22) Filed: Aug. 27, 2013

(65) Prior Publication Data

US 2015/0067845 A1 Mar. 5, 2015

(51) Int. Cl.
| | |
|---|---|
| *G06F 15/18* | (2006.01) |
| *G06F 21/50* | (2013.01) |
| *G06F 21/55* | (2013.01) |
| *H04L 29/06* | (2006.01) |

(52) U.S. Cl.
CPC .............. *G06F 21/50* (2013.01); *G06F 15/18* (2013.01); *G06F 21/554* (2013.01); *H04L 63/1425* (2013.01); *H04L 63/1483* (2013.01)

(58) Field of Classification Search
None
See application file for complete search history.

(56) References Cited

U.S. PATENT DOCUMENTS

| | | | |
|---|---|---|---|
| 7,822,266 | B2 | 10/2010 | Wellington et al. |
| 2009/0099988 | A1 | 4/2009 | Stokes et al. |
| 2012/0246098 | A1 | 9/2012 | Chari et al. |
| 2015/0067835 | A1 | 3/2015 | Chari et al. |

FOREIGN PATENT DOCUMENTS

WO 2012013920 A1 2/2012

OTHER PUBLICATIONS

Cho et al., Efficient anomaly detection by modeling privilege flows using hidden Markov model [online], Computers & Security vol. 22, No. 1, pp. 45-55, 2003 [retrieved on Sep. 24, 2015]. Retrieved from the Internet:<URL:http://www.sciencedirect.com/science/article/pii/S0167404803001123/pid=1-s2.0-S0167404803001123-main.pdf>.*

(Continued)

*Primary Examiner* — Stanley K Hill
*Assistant Examiner* — Nathan Brown, Jr.
(74) *Attorney, Agent, or Firm* — Thompson Hine LLP

(57) ABSTRACT

A method for detecting abnormal behavior of users is disclosed. Processors identify from a log of user activity, a first number of actions performed by a user over a first time period that match a pattern of user activity for a task associated with one or more roles of the users. Processors also identify from the log of user activity, a second number of actions performed by the user over a second time period that match the pattern of user activity. Processors calculate an amount of deviation between the first number of actions and the second number of actions. The deviation identifies a difference between amounts of time spent in the one or more roles. Processors then determine whether the amount of deviation between the first number of actions and the second number of actions exceeds a threshold for abnormal behavior.

16 Claims, 7 Drawing Sheets

(56) References Cited

OTHER PUBLICATIONS

Leckie, Anomaly-Based Security Protocol Attack Detection [online], Fall Semester, 2002 [retrieved on Apr. 6, 2016]. Retrieved from the Internet:<URL:http://www.google.com/url?sa=t&rct=j&q=&esrc=s&source=web&cd=2&cad=rja&uact=8&ved=ahUKEwjtnNTn8frLAhWL0h4KHZ9LCyQQFggyMAE&url=http%3A%2F%2Farxiv.org%2Fpdf>.*

Molloy et al., Generative Models for Access Control Policies: Applications to Role Mining Over Logs with Attribution, 2012.*

Frank et al., "A Class of Probabilistic Models for Role Engineering", Proceedings of the 15th ACM Conference on Computer and Communications Security (CCS'08), Oct. 2008, pp. 299-310.

Frank et al., "A Probabilistic Approach to Hybrid Role Mining", Proceedings of the 16th ACM Conference on Computer and Communications Security (CCS'09), Nov. 2009, pp. 101-111.

Molloy et al., "Generative Models for Access Control Policies: Applications to Role Mining Over Logs with Attribution", Proceedings of the 17th ACM symposium on Access Control Models and Technologies (SACMAT '12), Jun. 2012, pp. 45-56.

Molloy et al., "Mining Roles with Noisy Data", Proceedings of the 15th ACM Symposium on Access Control Models and Technologies (SACMAT '10), Jun. 2010, pp. 45-54.

Singh et al., "A Unified View of Matrix Factorization Models", Proceedings of the European conference on Machine Learning and Knowledge Discovery in Databases—Part II (ECML PKDD '08), Sep. 2008, pp. 358-373.

Singh et al., "Relational Learning via Collective Matrix Factorization", Proceedings of the 14th ACM SIGKDD international Conference on Knowledge Discovery and Data Mining (KDD '08), Aug. 2008, pp. 650-658.

Chari et al., "Detecting Anomalous User Behavior Using Generative Modesl of User Actions," U.S. Appl. No. 14/032,647, filed Sep. 20, 2013, 35 pages.

U.S. Patent and Trademark Office, Non-Final Office Action issued in related U.S. Appl. No. 14/032,647 dated Apr. 26, 2016.

Ilgun et al., "State Transition Analysis: A Rule-Based Intrusion Detection Approach", IEEE Transactions on Software Engineering, vol. XX. No. Y, Month 1999 [retreived on Mar. 14, 2016], Retrieved from the Internet: <http://ranger.uta.edu/~dliu/courses/cse6392-ids-spring2007/papers/IEEEToSE95-StateTransitionIDS.pdf>; pp. 1-22.

* cited by examiner

DETECTING ANOMALOUS USER BEHAVIOR USING GENERATIVE MODELS OF USER ACTIONS

BACKGROUND OF THE INVENTION

1. Field of the Invention

The disclosure relates generally to an improved data processing system, and, in particular, to processing information related to user behavior. Still more particularly the present disclosure relates to a method and apparatus for detecting abnormal behavior of users.

2. Description of the Related Art

Today there are many types of attacks on computing resources. Computer users carrying out such attacks may include visitors, customers, workers, and other types of computer users. Additionally, malware and other types of computer programs may carry out attacks on the computing resources. For example, malware may take control of a user's credentials to execute an attack on computing resources that the user has access to. In the context of detecting these attacks, there is interest in identifying when behavior of a user is indicative of an attack.

Current approaches to identify attacks match monitored behavior with suspicious patterns of behavior. These current approaches match the monitored behavior to fixed rules and statistics that are known to identify attacks. For example, identifying a number of failed login attempts before success as indicative of a password-guessing attack. Because the current approaches are restricted to identifying known patterns of attacks, they will not detect attacks which do not fit the known patterns.

Current statistical methods also exist for detecting suspicious behavior based on detecting deviations from a standard for frequency of user actions. For example, a statistical method for detecting suspicious behavior might include generating alerts based on identifying a computer user who downloads more than 5× the standard frequency of document downloads from an online repository as a possible attack. The number of alerts raised by such statistical methods may be large. Further, some number of these alerts may be for legitimate uses. A legitimate use identified in an alert is a false positive. When too many false positives are received, the alerts that are legitimate may be ignored or missed.

Therefore, it would be desirable to have a method, apparatus, and computer program product that takes into account at least some of the issues discussed above.

SUMMARY

In one illustrative embodiment, a method, apparatus, and computer program product for detecting abnormal behavior of users is disclosed. An apparatus identifies from a log of user activity, a first number of actions performed by a user over a first time period that match a pattern of user activity for a task associated with one or more roles of the users. The one or more roles of the users is generated by the apparatus from the log of user activity based on actions of the users over a period of time selected for determining the roles of the users. The apparatus also identifies from the log of user activity, a second number of actions performed by the user over a second time period that match the pattern of user activity. The apparatus calculates an amount of deviation between the first number of actions and the second number of actions. The deviation identifies a difference between amounts of time spent in the one or more roles. The apparatus then determines whether the amount of deviation between the first number of actions and the second number of actions exceeds a threshold for abnormal behavior. The threshold for abnormal behavior is one of a threshold for abnormal behavior of the user, a threshold for abnormal behavior of the user in the one or more roles, a threshold for abnormal behavior of the users, and a threshold for abnormal behavior of the users in the one or more roles.

DETAILED DESCRIPTION OF THE PREFERRED EMBODIMENT

Figure 1:
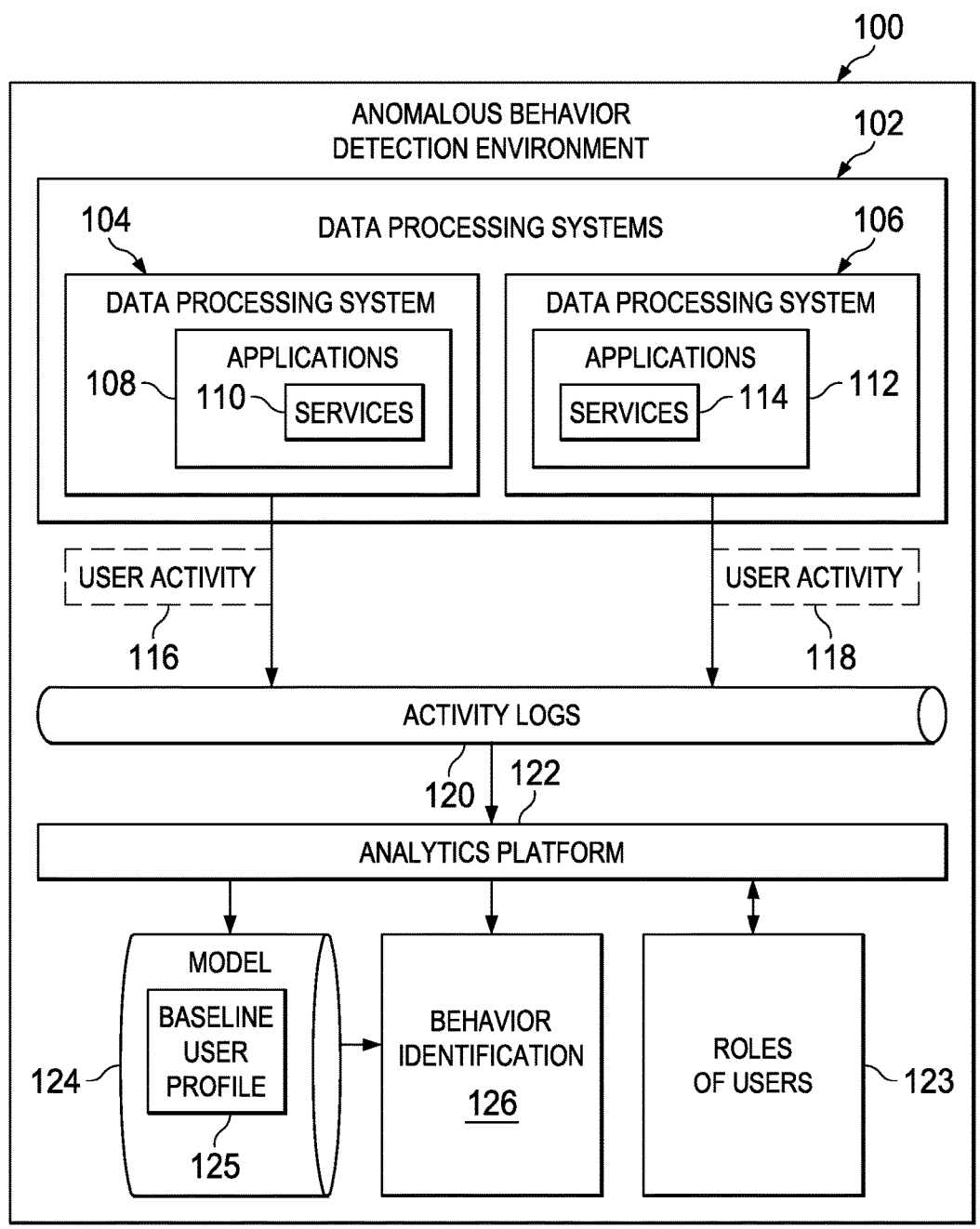
FIG. 1 is a block diagram of a data flow of a process for detecting abnormal behavior of users in an anomalous behavior detection environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on remote computers or entirely on the remote computers. In the latter scenario, the remote computers may be connected to the user's computer through any type of network, including a local area network (LAN) or a wide area network (WAN), or the connection may be made to an external computer. Further in this latter scenario, the remote computers may include hardware and software components in an anomalous behavior detection environment. For example, the components may be network appliances and other types of data processing systems that analyze data in the anomalous behavior detection environment.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The different illustrative embodiments provide a method, apparatus, and computer program product for detecting abnormal behavior of users. For example, a number of components of an anomalous behavior detection environment may use a process for detecting abnormal behavior of users. For example, an analytics platform component may identify from a log of user activity, a first number of actions performed by a user over a first time period that match a pattern of user activity for a task associated with one or more roles of the users. The one or more roles of the users may be generated by the analytics platform from the log of user activity based on actions of the users over a period of time selected for determining the roles of the users. The analytics platform component may also identify from the log of user activity, a second number of actions performed by the user over a second time period that match the pattern of user activity. A behavior identification component may calculate an amount of deviation between the first number of actions and the second number of actions. The deviation identifies a difference between amounts of time spent in the one or more roles. The behavior identification component may then determine whether the amount of deviation between the first number of actions and the second number of actions exceeds a threshold for abnormal behavior. The threshold for abnormal behavior may be one of a threshold for abnormal behavior of the user, a threshold for abnormal behavior of the user in the one or more roles, a threshold for abnormal behavior of the users, and a threshold for abnormal behavior of the users in the one or more roles.

With reference now to the figures and, in particular, with reference to FIG. 1, a block diagram of a data flow of a process for identifying influence on user interest for products in an anomalous behavior detection environment is depicted in accordance with an illustrative embodiment. Anomalous behavior detection environment 100 is an example of an environment for detecting abnormal behavior of users.

As depicted, anomalous behavior detection environment 100 includes a number of data processing systems 102, such as data processing system 104 and data processing system 106. In these illustrative examples, data processing system 104 executes applications 108 and data processing system 106 executes applications 112 to provide services. Applications 108 provide services 110 and applications 112 provide services 114. "A number," as used herein with reference to an item, means one or more items.

In these illustrated examples, user activity 116 and user activity 118 are examples of user activities associated with data processing systems 102. As depicted, user activity 116 and user activity 118 are stored in activity logs, such as activity logs 120. In these illustrative examples, user activity is any activity of a user associated with using data processing systems. For example, user activity 118 may be an activity associated with a role in roles of users 123. In these illustrative examples, a role of users is an authority assigned to users to do particular activities.

Analytics platform 122 is a component of anomalous behavior detection environment 100 for scoring and producing a baseline profile for a user. In these illustrative examples, analytics platform 122 generates roles of users 123. In these illustrative examples, role mining methods may be used by analytics platform 122 to identify roles of users 123 from activity logs 120. Each role in roles of users 123 is an authority for activity of users in activity logs 120. Analytics platform 122 also generates model 124 of time spent in roles for a user. Analytics platform 122 generates baseline user profile 125 in model 124 for a user by fitting user activity of the user to a global model for roles of users and obtaining a list of role fitness values. The list of role fitness values is a degree to which the user belongs to each role within a time period from which the user actions were drawn or obtained. As used herein, a global model for roles of users is an initial model for a number of users.

Baseline user profile 125 can be generated in one of several ways. For example, a baseline profile may be defined as the amount with which a user acts in each role in the either a first time period the user is active, or another time period from which the global model is built, whichever comes later. Baseline user profile 125 may be generated by any of several techniques for role mining. Baseline user profile 125 may be generated from a longer time period than used for scoring. For example, baseline user profile 125 may be generated over a time period that is ten (10) times longer than a time period used for scoring. In these illustrative examples, baseline user profile 125 may include an aggregate fitted model that is generated for the user. For example, a series of fittings may be generated by any of several techniques for role mining. For example, generative role mining methods may be used to generate a series of fittings for a user for a time period that is ten (10) times longer than a scoring period for each of a number of users. In this example, a secondary model is built over the series of fittings to determine a measure of uncertainty and significance with which each role is acted in, and to detect periodic user behavior. In this example, the secondary model may be built by clustering the individual fitting scores, using known techniques, such as k-means, Gaussian model, or a mixture of k-means and Gaussian model. In this example, a one-class classifier system, such as a support vector machine, is built to learn the samples.

Behavior identification 126 is a component of anomalous behavior detection environment 100 for measuring an amount of deviation between the user's actions in a later time period and the model. To measure the amount of deviation between the user's actions in a later time period and the model, user activities of a user are fit to the model to obtain a list of role fitness scores. For example, using a role fitness profile of the user, a distance function, such as root mean squared error, Kullback-Liebler divergence, or mean absolute error, is applied to measure an amount of deviation between the role fitness profile of the user and the obtained role fitness for the later time period. In this example, when the deviation exceeds a threshold, an alert is raised. As another example, using the secondary model built above, role fitness scores may be compared with the secondary model for deviation. In this example, identifying an amount of deviation is based on how the secondary model is generated. For example, if the k-means algorithm was applied to generate the secondary model then the distance to the nearest cluster centroid can be compared to the mean and standard deviation for all points belonging to that cluster. In this example, when the distance exceeds a threshold an alert is raised. Similarly, if a mixture of Gaussian model is used then the probability that the list of role fitness scores was drawn from the distribution can be calculated and alerted when it is statistically significant. Alternatively, when a one-class classifier algorithm is used, an anomaly score may be returned. For example, when a one-class support vector machine (SVM) is used the anomaly score is the distance from the hyperplane. In this example, when the anomaly score exceeds a threshold an alert is generated.

The illustration of anomalous behavior detection environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional components in addition to analytics platform 122 and behavior identification 126 may be present within anomalous behavior detection environment 100. For example, another component of analytics platform 122 may generate a role model for a user using one or more of a discrete and probabilistic role mining, single and multi-clustering algorithms, generative models, such as latent Dirichlet allocation, and hidden topic Markov models. In this example, the role model generation process takes as input a set of user activity over a given time period and produces a model of roles defined by the set of user activity. In these illustrative examples, new user activity is then fit to the role model of the user to produce a vector of fitness functions indicating the degree to which the user as defined by the activity pattern matches to the role model of the user.

Also, although data processing systems 102, activity logs 120, analytics platform 122, and behavior identification 126 are shown as separate blocks in anomalous behavior detection environment 100, all or a portion of these may also be implemented in data processing systems 102 or other suitable components in anomalous behavior detection environment 100. In these illustrative examples, anomalous behavior detection environment 100 may be implemented by any combination of hardware and software products, and may also be implemented in one or more computer systems of a cluster of computer systems.

Figure 2:
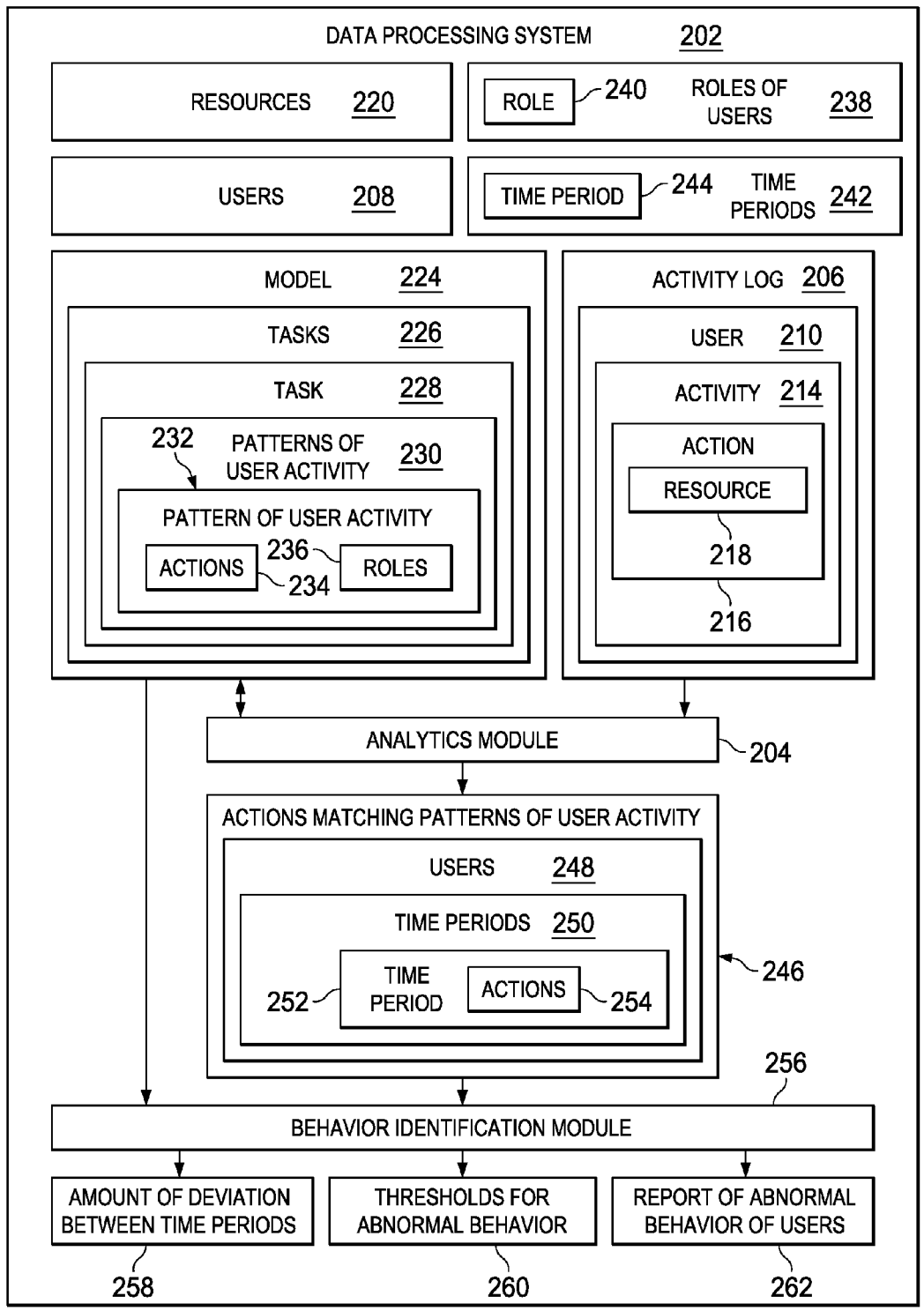
FIG. 2 is a block diagram of components in a data processing system involved in detecting abnormal behavior of users in accordance with an illustrative embodiment.

Turning now to FIG. 2, a block diagram of components in a data processing system involved in detecting abnormal behavior of users is depicted in accordance with an illustrative embodiment. In these illustrative examples, data processing system 202 may be any combination of hardware and software components implementing a process for detecting abnormal behavior of users. As depicted, analytics module 204 in data processing system 202 is an example of one implementation of analytics platform 122 in FIG. 1. Analytics module 204 processes activity log 206 in these illustrative examples. Activity log 206 is an example of one implementation of activity logs 120 in FIG. 1. Activity log 206 stores activities of users 208. User 210 is an example of a user in users 208 with activity in activity log 206.

As depicted, activity 214 is an activity of user 210 in activity log 206. As depicted, activity 214 may comprise action 216 taken by user 210. For example, activity 214 may be providing a password in response to a prompt. In this example, when user 210 provides a password, the user may be performing an activity known as logging in. As also depicted, action 216 taken by user 210 may be associated with resource 218. For example, when user 210 wishes to gain access to resource 218, user 210 may log into resource 218.

In these illustrative examples, resource 218 is an example of a resource in resources 220. In the illustrated examples, resources 220 include data processing systems, storage devices, and any suitable combination of hardware and software for use by users 208.

Analytics module 204 generates model 224, in these illustrated examples. Model 224 is an example of one implementation of model 124 in FIG. 1. Model 224 includes tasks 226. Task 228 is an example of a task in tasks 226 comprising patterns of user activity 230. In the illustrated examples, patterns of user activity 230 are performed by user 210 to complete task 228.

As depicted, pattern of user activity 232 is an example of patterns of user activity 230 comprising actions 234 and roles 236. Actions 234 are examples of action 216 and roles 236 are examples of roles of users 238. Roles of users 238 is an example of roles of users 123 in FIG. 1. In these illustrative examples, role 240 is an example of a role in roles of users 238. As used herein, a role of a user, such as role 240, is a function or position of a user taken while performing one or more tasks in tasks 226. For example, a manager takes the role of manager when managing users.

Analytics module 204 generates model 224 over particular time periods, such as time period 244 in time periods 242. In these illustrative examples, time period 244 may be a time period for model 224. For example, time period 244 may be selected as a time period for a prior year, a prior month, and other periods of time that are suitable periods of time for model 224. For example, time period 244 may be selected to include time periods in the past when a number of activities of users 238 occurred that are similar to a number of current activities of user 210.

In these illustrative examples, analytics module 204 may also generate actions matching patterns of user activity 246 for users 248 for time periods 250. As depicted, actions 254 for time period 252 is an example of actions matching patterns of user activity 246.

Behavior identification module 256 is a component of data processing system 202 that is implemented in hardware, software, or a combination of hardware and software. Behavior identification module 256 is an example of one implementation of behavior identification 126 in FIG. 1. As depicted, behavior identification module 256 processes actions matching patterns of user activity 246 in a process for identifying abnormal behavior of a user in users 208. In these illustrative examples, behavior identification module 256 determines amount of deviation between time periods 258 based on a calculated amount of deviation between actions taken by one or more users in the same roles over selected time periods in time periods 242 In these illustrative examples, amount of deviation between time periods 258 identifies a difference between amounts of time spent by a user in one or more roles in roles of users 238. For example, behavior identification module 256 may divide a first number of actions performed by user 210 over a first time period into a number of subgroups of actions performed by user 210 over a number of subintervals of time that are disjoint and continuous over the first time period. In this example, behavior identification module 256 may calculate amount of deviation between time periods 258 using differences between one or more amounts of deviation between a second number of actions performed by user 210 in a second time period and each of the number of subgroups.

As depicted, behavior identification module 256 determines if amount of deviation between time periods 258 exceed one of thresholds for abnormal behavior 260. In the illustrated examples, responsive to amount of deviation between time periods 258 exceeding one of thresholds for abnormal behavior 260, behavior identification module 256 may generate report of abnormal behavior of users 262. As depicted, report of abnormal behavior of users 262 may comprise information about amounts of deviation between time periods 258 for time spent by users 208 in one or more roles of users 238.

Figure 3:
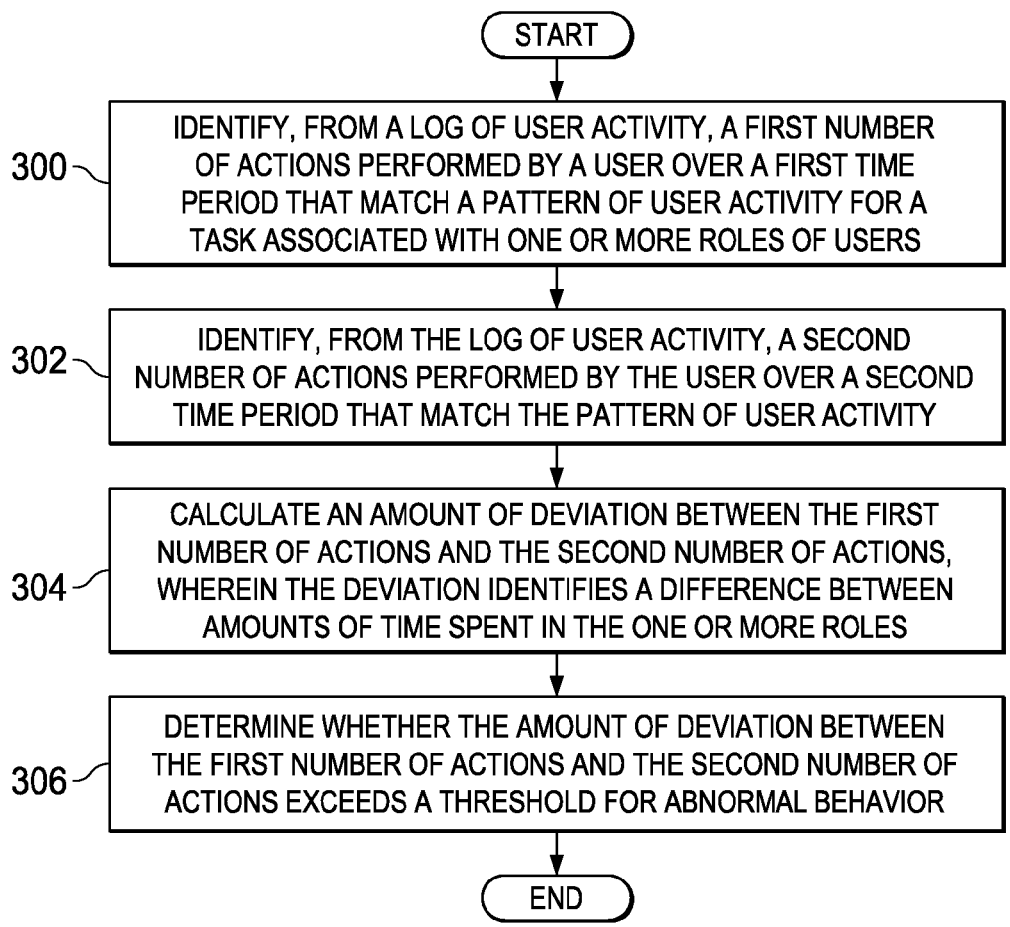
FIG. 3 is a flow chart of a process for detecting abnormal behavior of users in accordance with an illustrative embodiment.

Turning next to FIG. 3, an illustrative example of a flowchart of a process for detecting abnormal behavior of users is depicted in accordance with an illustrative embodiment. The steps in the process may be implemented in software, hardware, or a combination of the two by data processing system 202 in FIG. 2.

The process begins by identifying from a log of user activity, a first number of actions performed by a user over a first time period that match a pattern of user activity for a task associated with one or more roles of users (step 300). In this illustrated process, the log of user activity is an example of activity log 206 in FIG. 2. The first number of actions performed by the user over the first time period that match the pattern of user activity is an example of actions 234 in pattern of user activity 232 in FIG. 2 performed by user 210 in FIG. 2.

The process identifies from the log of user activity, a second number of actions performed by the user over a second time period that match the pattern of user activity (step 302). In this illustrated process, the second number of actions is another example of actions 234 in pattern of user activity 232 performed by user 210.

The process calculates an amount of deviation between the first number of actions and the second number of actions, wherein the deviation identifies a difference between amounts of time spent in the one or more roles (step 304). In this illustrated process, the amount of deviation between the first number of actions and the second number of actions is an example of amount of deviation between time periods 258 in FIG. 2.

The process then determines whether the amount of deviation between the first number of actions and the second number of actions exceeds a threshold for abnormal behavior (step 306) with the process terminating thereafter. In this illustrated process, the threshold for abnormal behavior is one example of thresholds for abnormal behavior 260 in FIG. 2. It should also be noted that, although steps 300 and 302 are shown in succession, steps 300 and 302 may, in fact, be performed substantially concurrently and steps 300 and 302 may also be performed in the reverse order.

Figure 4:
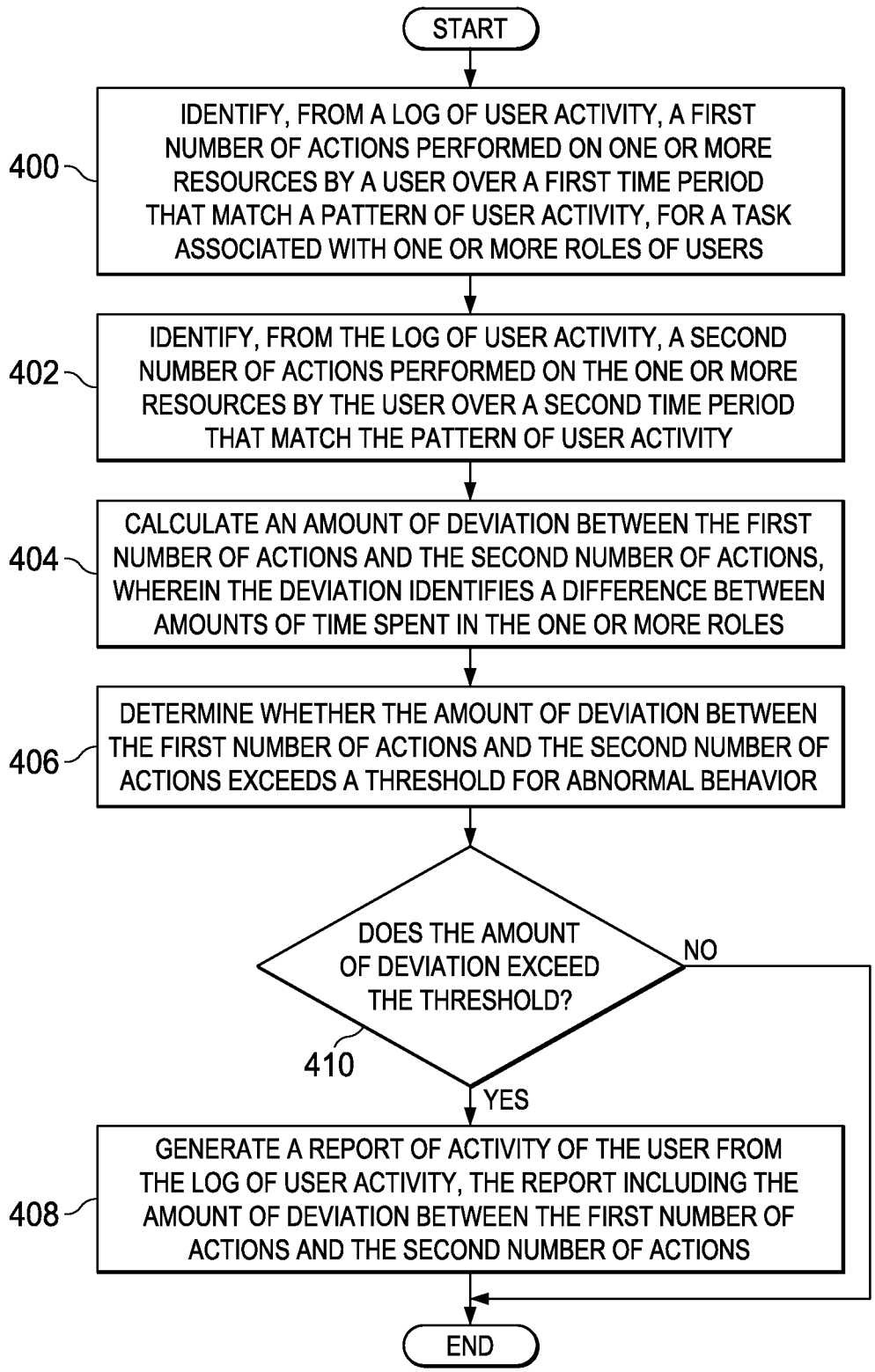
FIG. 4 is a flow chart of a process for detecting and reporting abnormal behavior of users in accordance with an illustrative embodiment.

Turning next to FIG. 4, an illustrative example of a flowchart of a process for detecting and reporting abnormal behavior of users is depicted in accordance with an illustrative embodiment. The steps in the process may be implemented in software, hardware, or a combination of the two by data processing system 202 in FIG. 2.

The process begins by identifying from a log of user activity, a first number of actions performed on one or more resources by a user over a first time period that match a pattern of user activity for a task associated with one or more roles of users (step 400). In this illustrated process, the log of user activity is an example of activity log 206 in FIG. 2. The first number of actions performed by the user over the first time period that match the pattern of user activity is an example of actions 234 in pattern of user activity 232 in FIG. 2 performed by user 210 in FIG. 2; the one or more resources is an example of resources 222 in FIG. 2; the task associated with the role of users is an example of task 228 in FIG. 2; and the role of users is an example of a role in roles 236 in FIG. 2.

The process identifies from the log of user activity, a second number of actions performed on one or more resources by the user over a second time period that match the pattern of user activity (step 402). In this illustrated process, the second number of actions is another example of actions 234 in pattern of user activity 232 performed by user 210.

The process calculates an amount of deviation between the first number of actions and the second number of actions, wherein the deviation identifies a difference between amounts of time spent in the one or more roles (step 404). In this illustrated process, the amount of deviation between the first number of actions and the second number of actions is an example of amount of deviation between time periods 258 in FIG. 2.

The process then determines whether the amount of deviation between the first number of actions and the second number of actions exceeds a threshold for abnormal behavior (step 406). In this illustrated process, the threshold for abnormal behavior is one example of thresholds for abnormal behavior 260 in FIG. 2.

As depicted in step 410, responsive to the amount of deviation exceeding the threshold the process generates a report of activity of the user from the log of user activity, the report including the amount of deviation between the first number of actions and the second number of actions (step 408) with the process terminating thereafter. In this illustrated process, the report of activity of the user is one example of report of abnormal behavior of users 262 in FIG. 2. As also depicted in step 410, the process terminates without generating the report of activity of the user from the log of user activity in response to the amount of deviation not exceeding the threshold.

Figure 5:
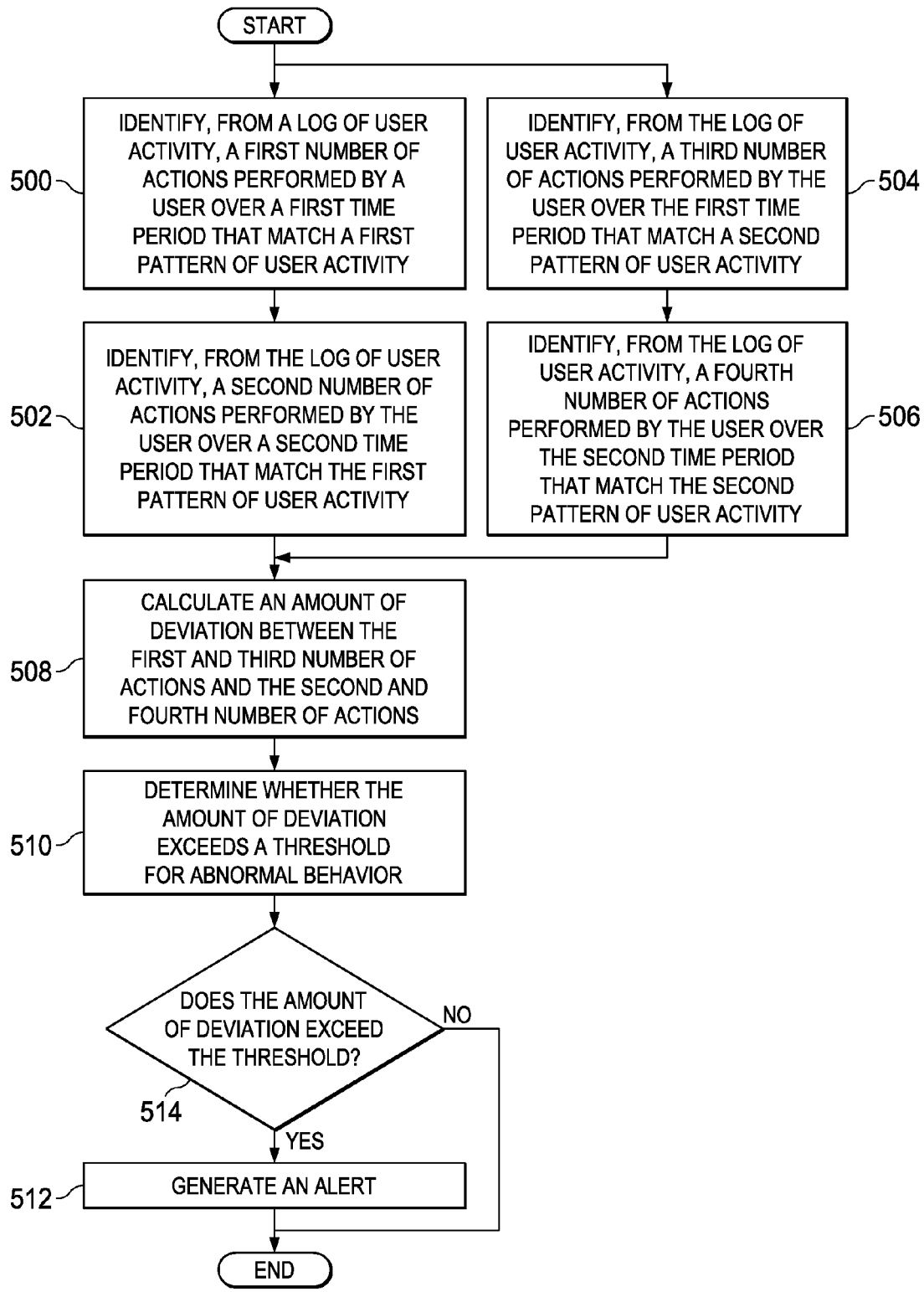
FIG. 5 is a flow chart of a process for detecting abnormal behavior of users based on an identified change to deviation of behavior in accordance with an illustrative embodiment.

Turning next to FIG. 5, an illustrative example of a flowchart of a process for detecting abnormal behavior of users based on an identified change to deviation of behavior is depicted in accordance with an illustrative embodiment. The steps in the process may be implemented in software, hardware, or a combination of the two by data processing system 202 in FIG. 2.

The process begins by identifying from a log of user activity, a first number of actions performed by a user over a first time period that match a first pattern of user activity (step 500). In this illustrated process, the log of user activity is an example of activity log 206 in FIG. 2. The first number of actions performed by the user over the first time period that match the pattern of user activity is an example of actions 234 in pattern of user activity 232 in FIG. 2 performed by user 210 in FIG. 2.

The process identifies from the log of user activity, a second number of actions performed by the user over a second time period that match the first pattern of user activity (step 502); a third number of actions performed by the user over the first time period that match a second pattern of user activity (step 504); and a fourth number of actions performed by the user over the second time period that match the second pattern of user activity (step 506). In this illustrated process, the second, third, and fourth number of actions are other examples of actions 234 in pattern of user activity 232 performed by user 210.

The process calculates an amount of deviation between the first and third number of actions and the second and fourth number of actions (step 508). In this illustrated process, the amount of deviation between the first and third number of actions and the second and fourth number of actions is an example of amount of deviation between time periods 258 in FIG. 2.

The process next determines whether the amount of deviation exceeds a threshold for abnormal behavior (step 510). In this illustrated process, the threshold for abnormal behavior is one example of thresholds for abnormal behavior 260 in FIG. 2.

As depicted in step 514, responsive to the amount of deviation exceeding the threshold the process then generates an alert (step 512) with the process terminating thereafter. In this illustrated process, the alert is one example of report of abnormal behavior of users 262 in FIG. 2. As also depicted in step 514, the process terminates without generating the alert in response to the amount of deviation not exceeding the threshold. Although steps 500, 502, 504, and 506 are shown in succession, these steps may, in fact, be performed substantially concurrently.

Figure 6:
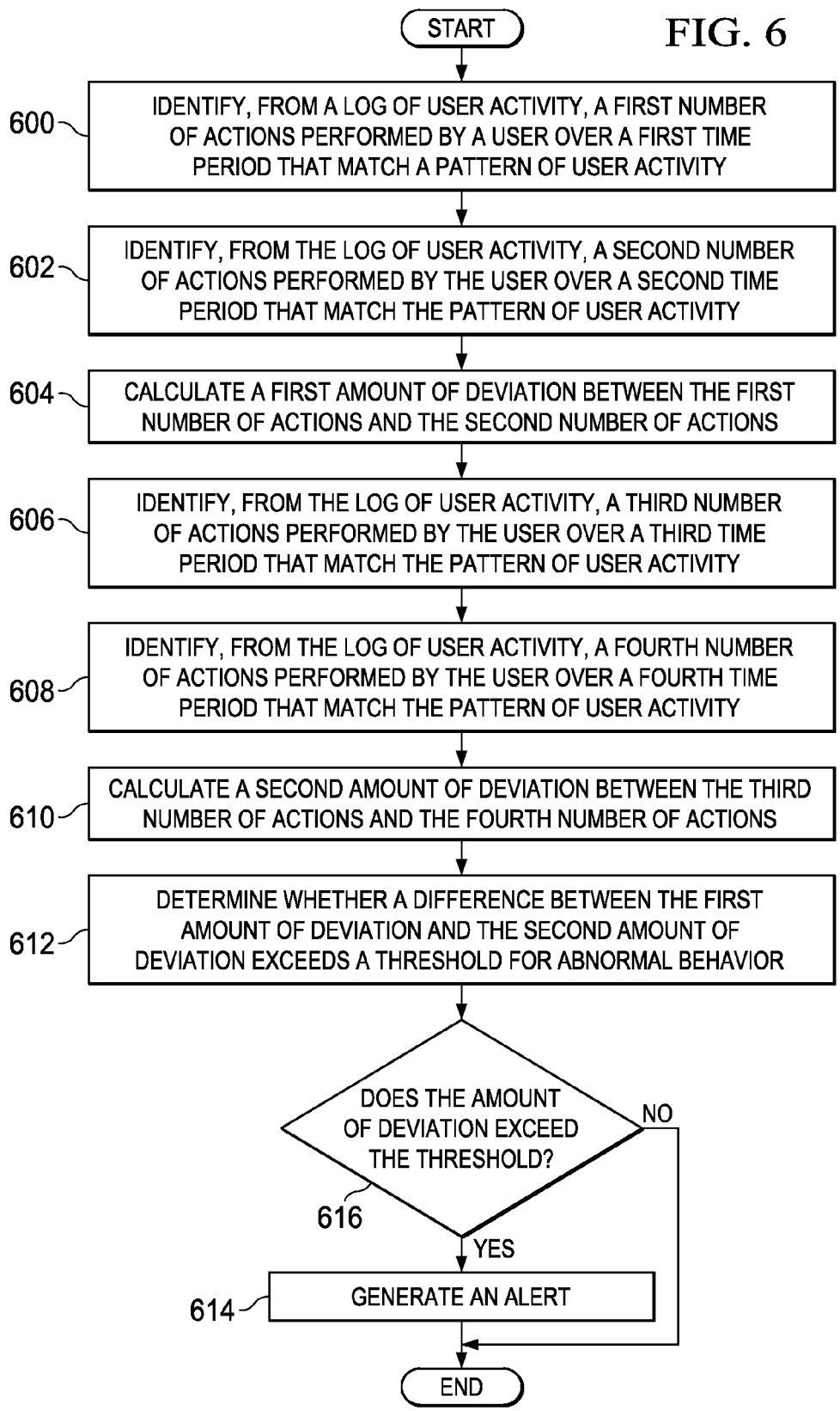
FIG. 6 is a flow chart of a process for detecting abnormal behavior of users based on identified deviation of behavior while performing a number of tasks in accordance with an illustrative embodiment.

Turning next to FIG. 6, an illustrative example of a flowchart of a process for detecting abnormal behavior of users based on identified deviation of behavior while performing a number of tasks is depicted in accordance with an illustrative embodiment. The steps in the process may be implemented in software, hardware, or a combination of the two by data processing system 202 in FIG. 2.

The process begins by identifying from a log of user activity, a first number of actions performed by a user over a first time period that match a pattern of user activity (step 600). In this illustrated process, the log of user activity is an example of activity log 206 in FIG. 2. The first number of actions performed by the user over the first time period that match the pattern of user activity is an example of actions 234 in pattern of user activity 232 in FIG. 2 performed by user 210 in FIG. 2.

The process also identifies from the log of user activity, a second number of actions performed by the user over a second time period that match the pattern of user activity (step 602). The process then calculates a first amount of deviation between the first number of actions and the second number of actions (step 604).

The process further identifies from the log of user activity, a third number of actions performed by the user over a third time period that match the pattern of user activity (step 606) and a fourth number of actions performed by the user over a fourth time period that match the pattern of user activity (step 608). The process then further calculates a second amount of deviation between the third number of actions and the fourth number of actions (step 610). In this illustrated process, the second, third, and fourth number of actions are other examples of actions 234 in pattern of user activity 232 performed by user 210. In this illustrated process, the first amount of deviation and the second amount of deviation are examples of amount of deviation between time periods 258 in FIG. 2.

The process next determines whether a difference between the first amount of deviation and the second amount of deviation exceeds a threshold for abnormal behavior (step 612). As depicted in step 616, responsive to the amount of deviation exceeding the threshold the process then generates an alert (step 614) with the process terminating thereafter. As also depicted in step 616, the process terminates without generating the alert in response to the amount of deviation not exceeding the threshold. It should also be noted that, although a first sequence of steps 600, 602, and 604 to calculate the first amount of deviation is shown in succession with a second sequence of steps 606, 608, and 610 to calculate the second amount of deviation, the first and second sequence of steps may, in fact, be performed substantially concurrently.

Figure 7:
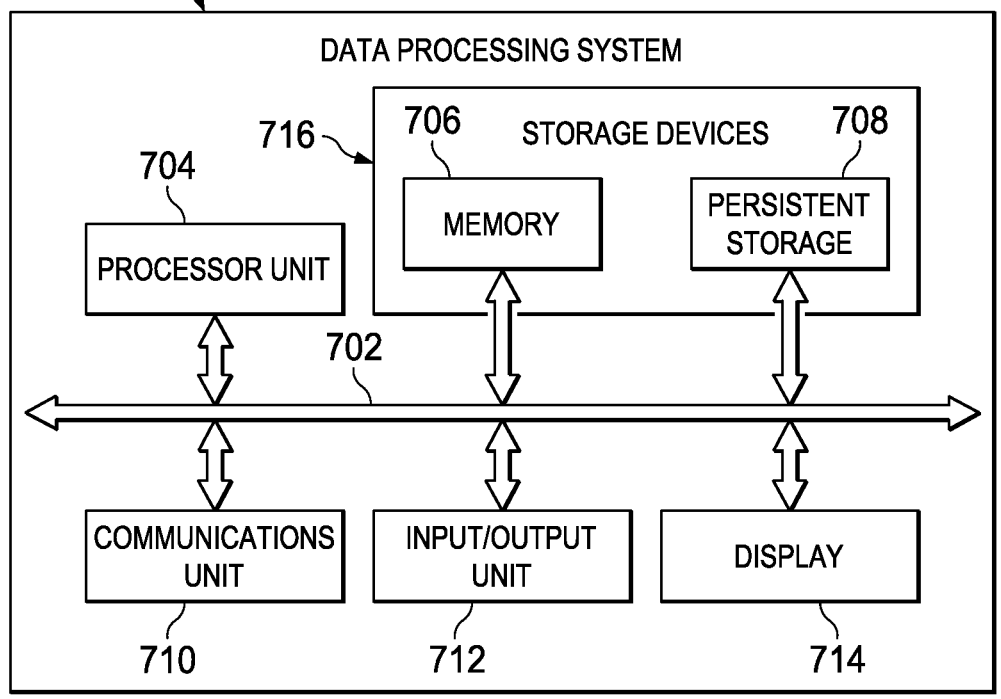
FIG. 7 is an illustration of a data processing system in accordance with an illustrative embodiment.
Figure 7:
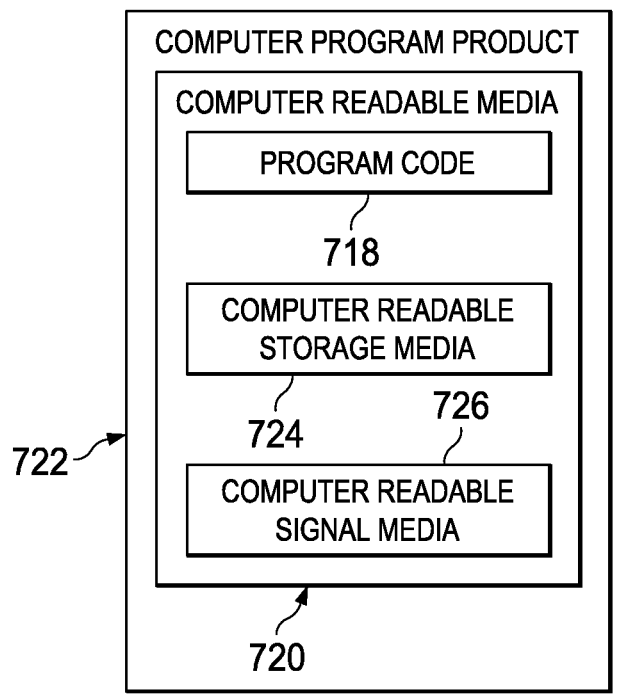

Turning now to FIG. 7, an illustration of a data processing system is depicted in accordance with an illustrative embodiment. Data processing system 700 is an example of a data processing system that may be used to identify abnormal behavior of users. More particularly, data processing system 700 may be used to implement data processing system 202 in FIG. 2. In this illustrative example, data processing system 700 includes communications framework 702, which provides communications between processor unit 704, memory 706, persistent storage 708, communications unit 710, input/output (I/O) unit 712, and display 714. In these examples, communications frame work 702 may be a bus system.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations. For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications framework 702.

Thus, the illustrative embodiments provide a method, apparatus, and computer program product for detecting abnormal behavior of users. In one example, a program identifies from a log of user activity, a first number of actions performed on one or more resources by a user over a first time period that match a pattern of user activity for a task associated with one or more roles of users. In this example, the one or more roles of the users is generated by the program from the log of user activity based on actions of the users over a period of time selected for determining the roles of the users. In this example, the program identifies from the log of user activity, a second number of actions performed on one or more resources by the user over a second time period that match the pattern of user activity. The program calculates an amount of deviation between the first number of actions and the second number of actions, wherein the deviation identifies a difference between amounts of time spent in the one or more roles. The program next determines whether the amount of deviation between the first number of actions and the second number of actions exceeds a threshold for abnormal behavior. In this example, the threshold for abnormal behavior is one of a threshold for abnormal behavior of the user, a threshold for abnormal behavior of the user in the one or more roles, a threshold for abnormal behavior of the users, and a threshold for abnormal behavior of the users in the one or more roles. Responsive to the amount deviation exceeding the threshold, the program then generates a report of activity of the user from the log of user activity. In this example, the report includes the amount of deviation between the first number of actions and the second number of actions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting abnormal behavior of users, the method comprising:
   identifying, by one or more processors and from a log of user activity, a first number of actions performed by a user over a first time period that match a pattern of user activity for a task associated with one or more roles of the users, wherein each of the one or more roles represents an authority associated with one or more of the users;
   identifying, by the one or more processors and from the log of user activity, a second number of actions performed by the user over a second time period that match the pattern of user activity for the task associated with the one or more roles;
   identifying a difference between amounts of time spent in the one or more roles in the first time period and the second time period based on the first number of actions and the second number of actions; and
   determining, by the one or more processors, whether the difference exceeds a threshold for abnormal behavior.

2. The method of claim 1, further comprising:
   generating the one or more roles from the log of user activity based on actions of the users over a period of time selected for determining the one or more roles of the users.

3. The method of claim 2, wherein the generating of the one or more roles further comprises using role mining methods to identify the one or more roles.

4. The method of claim 3, wherein the role mining methods comprise one or more of discrete and probabilistic role mining, single and multi-clustering algorithms, latent Dirichlet allocation, and hidden topic Markov models.

5. The method of claim 1, wherein the first number of actions and the second number of actions are performed on one or more resources, and further comprising:
   identifying the one or more roles based in part on the one or more resources the first number of actions and the second number of actions are performed on.

6. The method of claim 1, wherein the threshold for abnormal behavior is one of a threshold for abnormal behavior of the user, a threshold for abnormal behavior of the user in the one or more roles, a threshold for abnormal behavior of the users, and a threshold for abnormal behavior of the users in the one or more roles.

7. The method of claim 1, further comprising:
   generating, by the one or more processors, a report of abnormal behavior responsive to a determination that the difference exceeds the threshold for abnormal behavior.

8. The method of claim 7, wherein the report of abnormal behavior comprises an alert.

9. The method of claim 1, wherein identifying the difference between the amounts of time spent in the one or more roles in the first time period and the second time period based on the first number of actions and the second number of actions comprises:
   dividing, by the one or more processors, the first number of actions performed by the user over the first time period into a number of subgroups of actions performed by the user over a number of subintervals of time that are disjoint and continuous over the first time period; and
   determining one or more amounts of deviation between the second number of actions and each of the number of subgroups, wherein the difference is based on the one or more amounts of deviation.

10. The method of claim 1, wherein identifying the difference between amounts of time spent in the one or more roles in the first time period and the second time period based on the first number of actions and the second number of actions comprises:
    calculating an amount of deviation between the first number of actions and the second number of actions to identify the difference.

11. The method of claim 10, wherein calculating the amount of deviation between the first number of actions and the second number of actions comprises:
    fitting the first number of actions to a model for roles to determine a first list of role fitness values that represents a degree to which the user belongs to each of the one or more roles within the first time period;
    fitting the second number of actions to the model for roles to determine a second list or role fitness values that represents a degree to which the user belongs to each of the one or more roles within the second time period; and
    comparing the first list of role fitness values with the second list of role fitness values to determine the deviation.

12. A method for detecting abnormal behavior of users, the method comprising:
    identifying, by the one or more processors and from a log of user activity, a first number of actions performed by a user over a first time period that match a first pattern of user activity for a first task associated with one or more first roles of the users, and a second number of actions performed by the user over the first time period that match a second pattern of user activity for a second task associated with one or more second roles of the users, wherein each of the one or more first roles and the one or more second roles represents an authority that is associated with one or more of the users; and
    identifying, by the one or more processors and from the log of user activity, a third number of actions performed by the user over a second time period that match the first pattern of user activity for the first task associated with the one or more first roles, and a fourth number of actions performed by the user over the second time period that match the second pattern of user activity for the second task associated with the one or more second roles;
    identifying, by the one or more processors, a difference between time spent by the user in the one or more first roles and the one or more second roles in the first time period and time spent by the user in the one or more first roles and the one or more second roles in the second time period based on the first number of actions, the second number of actions, the third number of actions, and the fourth number of actions; and
    determining, by one or more processors, whether the difference exceeds a threshold for abnormal behavior.

13. The method of claim 12, wherein the first task and the one or more first roles differs from the second task and the one or more second roles.

14. The method of claim 12, wherein identifying the difference between time spent by the user in the one or more first roles and the one or more second roles in the first time period and time spent by the user in the one or more first roles and the one or more second roles in the second time period based on the first number of actions, the second number of actions, the third number of actions, and the fourth number of actions comprises:
  identifying a first amount of time spent by the user performing the first number of actions, a second amount of time spent by the user performing the second number of actions, a third amount of time spent by the user performing the third number of actions, and a fourth amount of time spent by the user performing the fourth number of actions;
  identifying a first ratio of time spent by the user between the first amount of time and the second amount of time in the first time period;
  identifying a second ratio of time spent by the user between the third amount of time and the fourth amount of time in the second time period; and
  calculating, as the difference between time spent by the user in the one or more first roles and the one or more second roles in the first time period and time spent by the user in the one or more first roles and the one or more second roles in the second time period, a difference between the first ratio and the second ratio.

15. A method for detecting abnormal behavior of users, the method comprising:
  identifying, by one or more processors and from a log of user activity, a first number of actions performed by a user over a first time period that match a pattern of user activity for a task associated with one or more roles of the users, a second number of actions performed by the user over a second time period that match the pattern of user activity for the task associated with the one or more roles of the users, a third number of actions performed by the user over a third time period that match the pattern of user activity for the task associated with the one or more roles of the users, and a fourth number of actions performed by the user over a fourth time period that match the pattern of user activity for the task associated with the one or more roles of the users, wherein each of the one or more roles represents an authority associated with one or more of the users;
  identifying, by one or more processors, a first difference between amounts of time spent in the one or more roles in the first time period and the second time period based on the first number of actions and the second number of actions;
  identifying, by the one or more processors, a second difference between amounts of time spent in the one or more roles in the third time period and the fourth time period based on the third number of actions and the fourth number of actions; and
  determining, by one or more processors, whether a third difference between the first difference and the second difference exceeds a threshold for abnormal behavior.

16. The method of claim 15, wherein the first difference and the second difference are determined using a distance function selected from the group consisting of a root mean squared error function, a Kullback-Liebler divergence function, and a mean absolute error function.

* * * * *